(12) United States Patent
Sayers et al.

(10) Patent No.: US 9,195,456 B2
(45) Date of Patent: Nov. 24, 2015

(54) MANAGING A CATALOG OF SCRIPTS

(71) Applicant: Hewlett-Packard Development Company, L.P., Houston, TX (US)

(72) Inventors: Craig Peter Sayers, Menlo Park, CA (US); Alkiviadis Simitsis, Santa Clara, CA (US); Alejandro Guerrero Gonzalez, San Luis Potosi (MX); David Alan Tamez Cantu, Nuevo León (MX); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 169 days.

(21) Appl. No.: 13/874,342

(22) Filed: Apr. 30, 2013

(65) Prior Publication Data
US 2014/0325476 A1 Oct. 30, 2014

(51) Int. Cl.
*G06F 9/44* (2006.01)
*G06F 9/455* (2006.01)
*G06F 11/36* (2006.01)

(52) U.S. Cl.
CPC .............. *G06F 8/70* (2013.01); *G06F 9/45512* (2013.01); *G06F 8/30* (2013.01); *G06F 9/45508* (2013.01); *G06F 11/3688* (2013.01)

(58) Field of Classification Search
CPC ... G06F 9/45512; G06F 9/45508; G06F 8/30; G06F 8/71; G06F 8/20; G06F 8/36; G06F 11/3688; G06F 11/3664
See application file for complete search history.

(56) References Cited

U.S. PATENT DOCUMENTS

| | | | |
|---|---|---|---|
| 6,078,924 A | 6/2000 | Ainsbury et al. | |
| 7,448,022 B1 | 11/2008 | Ram et al. | |
| 7,624,380 B2 * | 11/2009 | Okada | 717/125 |
| 7,653,652 B2 * | 1/2010 | Kagalwala et al. | 707/999.103 |
| 7,765,045 B2 | 7/2010 | Yoshida et al. | |
| 2007/0022414 A1 * | 1/2007 | Bird | 717/143 |
| 2007/0214171 A1 * | 9/2007 | Behnen et al. | 707/102 |
| 2008/0133891 A1 * | 6/2008 | Salz et al. | 712/220 |
| 2008/0289012 A1 | 11/2008 | Shi et al. | |
| 2009/0177957 A1 * | 7/2009 | Bouillet et al. | 715/230 |
| 2010/0057917 A1 * | 3/2010 | Xu et al. | 709/226 |
| 2010/0293523 A1 * | 11/2010 | Ahadian et al. | 717/108 |
| 2011/0295833 A1 * | 12/2011 | Narasayya et al. | 707/713 |
| 2011/0302593 A1 * | 12/2011 | Gatesman et al. | 719/313 |
| 2012/0011488 A1 * | 1/2012 | Suzuki | 717/115 |
| 2012/0023484 A1 * | 1/2012 | Demant et al. | 717/125 |
| 2012/0203782 A1 | 8/2012 | Olston et al. | |
| 2012/0310916 A1 * | 12/2012 | Abadi et al. | 707/713 |
| 2013/0041900 A1 * | 2/2013 | McCoy et al. | 707/737 |
| 2013/0104105 A1 * | 4/2013 | Brown et al. | 717/124 |
| 2013/0283233 A1 * | 10/2013 | Castellanos et al. | 717/113 |
| 2013/0332449 A1 * | 12/2013 | Amos et al. | 707/714 |
| 2014/0101092 A1 * | 4/2014 | Simitsis et al. | 707/602 |
| 2014/0129575 A1 * | 5/2014 | Kim et al. | 707/755 |

(Continued)

OTHER PUBLICATIONS

Papastefanatos et al., "HECATAEUS: Regulating Schema Evolution", 2010 IEEE, ICDE, Mar. 2010, pp. 1181-1184; <http://ieeexplore.ieee.org/stamp/stamp.jsp?tp=&arnumber=5447778>.*

(Continued)

*Primary Examiner* — Thuy Dao
*Assistant Examiner* — Ben C Wang
(74) *Attorney, Agent, or Firm* — Mannava & Kang, P.C.

(57) ABSTRACT

According to an example, a catalog of scripts may be managed. Management of the catalog of scripts may include the addition of a script description into the catalog of scripts. In one example, the script description may be directly added to the catalog of scripts. In another example, the script description may be added through generation of a merged query of scripts.

14 Claims, 6 Drawing Sheets

(56) References Cited

U.S. PATENT DOCUMENTS

| | | | |
|---|---|---|---|
| 2014/0136473 A1* | 5/2014 | Faerber et al. | 707/607 |
| 2014/0156633 A1* | 6/2014 | Duan et al. | 707/713 |
| 2014/0172809 A1* | 6/2014 | Gardella et al. | 707/705 |
| 2014/0222856 A1* | 8/2014 | Lakshminath et al. | 707/769 |
| 2014/0279838 A1* | 9/2014 | Tsirogiannis et al. | 707/603 |
| 2014/0280287 A1* | 9/2014 | Ganti et al. | 707/766 |
| 2014/0324839 A1* | 10/2014 | Sayers et al. | 707/723 |
| 2015/0039941 A1* | 2/2015 | Kalyanasundram | 714/38.1 |

OTHER PUBLICATIONS

Sayers et al., "The Farm—where Pig Scripts are bred and raised", ACM, SIGMOD'13, Jun. 22-27, 2013, pp. 1025-1028; <http://dl.acm.org/results.cfm?h=1&cfid=536318826&cftoken=43239081>.*

Koutrika et al., "Mirror mirror on the wall, which query's fairest of them all?", CIDR (Conference on Innovative Data Systems Research) 2013, Jan. 6-9, 2013, pp. 1-4; <http://www.cidrdb.org/cidr2013/Papers/CIDR13_Paper146.pdf>.*

Apache Pig, "Performance and Efficiency," <http://pig.apache.org/. Download Date: Apr. 30, 2013.

Koutrika, Georgia, et al., "Explaining Structured Queries in Natural Language", pp. 333-344, 2010.

Lethbridge, Timothy C., "How Software Engineers Use Documentation: The State of the Practice", IEEE Software, pp. 35-39, 2003.

Simitsis, Alkis, et al., "Optimizing Analytic Data Flows for Multiple Execution Engines", In SIGMOD, pp. 829-840, 2012.

Thummalapenta, Suresh, et al., "PARSEWeb: A Programmer Assistant for Reusing Open Source Code on the Web", In ASE, 2007.

* cited by examiner

MANAGING A CATALOG OF SCRIPTS

BACKGROUND

Programming large systems, such as big data systems, is relatively complex and thus often requires developers that have requisite skills to program such systems. For instance, many developers would like to perform big-data analytics using Map/reduce engines such as Hadoop® or parallel database engines such as Vertica™, which is available from the HP Vertica of Cambridge, Mass. However, many of the developers lack the necessary expert skills to perform such big-data analytics. To ease the task for developers, scripting languages such as "Pig", which is a high-level platform for creating map-reduce programs, are being developed. These scripting languages are often automatically optimized and compiled to run either as a series of map-reduce operations on Hadoop®, or as complex SQL expressions on Vertica™.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
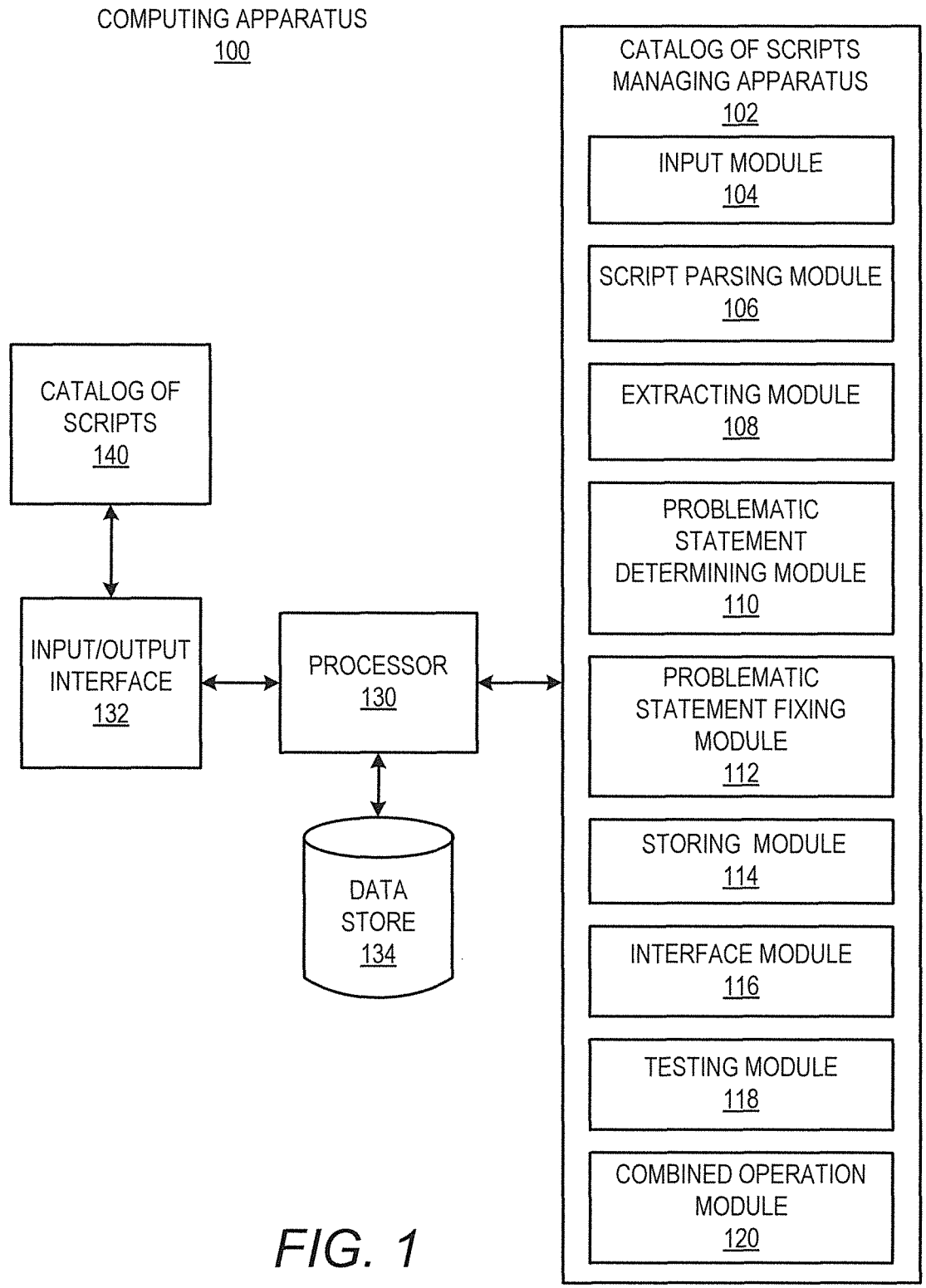
FIG. 1 depicts a simplified block diagram of a computing apparatus, which may implement various features disclosed herein, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are methods and computing apparatuses for managing a catalog of scripts. Particularly, the methods and computing apparatuses disclosed herein may manage a catalog of scripts by supporting the creation, discovery, composition, and optimized execution of the scripts. According to an example, each of the scripts is an executable service, with inputs and outputs that are defined by relation schema. The services may be discoverable through use of natural language searches and may be composable through use of a graphical interface, such as through a drag-and-drop interface. According to an example, the scripts in the catalog of scripts may perform analytics over data, for instance, using map-reduce engines. By way of particular example, the scripts may be Pig scripts, although other types of scripts may be implemented.

According to an example, through implementation of the methods and apparatuses disclosed herein, a user may input a script to be added to the catalog of scripts, which is also referred to herein as a script catalog. In this example, descriptions of the inputs and outputs of the script may be extracted and potentially problematic statements may be identified and corrected automatically and/or through user intervention, to therefore substantially avoid incompatibility of the statements in the script during later merging of the script with other scripts. In addition, the user is provided with an opportunity, for instance through a graphical interface, to associate a name and/or other identifier to the description of the script, which may be useful in the future discovery of the script. The user may also associate names and/or other identifiers to the descriptions of the inputs, outputs, and/or schemas of the script through the interface. In one regard, the descriptions of the inputs and the outputs of the script may be clearly defined and the machine-readable scripts and schemas may be supplemented with natural language text, for instance, to enable users to discover and merge the script with other scripts.

According to another example, through implementation of the methods and apparatuses disclosed herein, a user may create a new script by selecting a plurality of descriptions of scripts contained in the script catalog to be merged together. A user may select to create the new script, for instance, if a unique script or a previously selected combination of scripts does not already exist in the catalog. In creating the new script, the user may create new schemas and scripts either by entering directly, or by extending existing entries. In one regard, the creation of a new script through a selection to combine the plurality of scripts may be relatively simpler than requiring the user to generate the script from scratch. In addition, the method and apparatus disclosed herein may further simplify the process of creating the new script by guiding the user in selecting input and output schemas without needing to extract the input and output schemas from a raw script. Moreover, the selected scripts to be composed may be analyzed to identify the parts of the scripts that need to be removed, added, or merged in order for the selected scripts to be merged properly. In any regard, a description of the new script may be added to the catalog of scripts and thus, the efforts involved in building each composition of scripts may be amortized over subsequent users.

Through implementation of the methods and apparatuses disclosed herein, a catalog of scripts may be managed in a manner that enables previously generated scripts to be easily discovered and new scripts to be easily generated. The management of the catalog of scripts disclosed herein therefore enables users, such as developers, to build new solutions without having to start from scratch. In addition, a user-friendly graphical, e.g., drag and drop, interface may be provided to enable users to relatively easily add new scripts, for instance, through merging of existing scripts. Furthermore, as the scripts in the catalog of scripts may be identified through natural language descriptions, users may relatively easily discover the scripts that may perform the functions that the users seek.

In one regard, therefore, users may publish existing scripts and use the shared knowledge of other users when developing new scripts. Each of the scripts for which descriptions are added to the catalog of scripts may become an executable service, in which inputs and outputs are defined by relation schemas. Those services may be discoverable using natural language searches and may also be composable through a relatively user-friendly interface. A user may thus discover, compose, and run those scripts (e.g., services) on their own data without writing code. As such, users may program large systems without having to have the ability to write the code associated with programming the large systems. The large systems may be big data systems, which may be defined systems that include a collection of data sets that are so large and complex that it becomes difficult and/or inefficient to process using traditional data processing applications.

With reference first to FIG. 1, there is shown a simplified block diagram of a computing apparatus 100, which may implement various features disclosed herein, according to an example. It should be understood that the computing apparatus 100 may include additional elements and that some of the elements depicted therein may be removed and/or modified without departing from a scope of the computing apparatus 100.

Generally speaking, the computing apparatus 100 may be a desktop computer, a server, a laptop computer, a tablet computer, etc., at which a catalog of scripts may be managed as discussed in greater detail herein. The computing apparatus 100 is depicted as including a catalog of scripts managing apparatus 102, a processor 130, an input/output interface 132, a data store 134, and a catalog of scripts 140. The catalog of scripts managing apparatus 102 is also depicted as including an input module 104, a script parsing module 106, an extracting module 108, a problematic statement determining module 110, a problematic statement fixing module 112, a storing module 114, an interface module 116, a testing module 118, and a combined operation module 120.

The processor 130, which may be a microprocessor, a micro-controller, an application specific integrated circuit (ASIC), and the like, is to perform various processing functions in the computing apparatus 100. One of the processing functions may include invoking or implementing the modules 104-120 of the managing apparatus 102 as discussed in greater detail herein below. According to an example, the managing apparatus 102 is a hardware device, such as, a circuit or multiple circuits arranged on a board. In this example, the modules 104-120 may be circuit components or individual circuits.

According to another example, the managing apparatus 102 is a hardware device, for instance, a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like, on which software may be stored. In this example, the modules 104-120 may be software modules stored in the managing apparatus 102. According to a further example, the modules 104-120 may be a combination of hardware and software modules.

The processor 130 may store data in the data store 134 and may use the data in implementing the modules 104-120. The data store 134 may be volatile and/or non-volatile memory, such as DRAM, EEPROM, MRAM, phase change RAM (PCRAM), Memristor, flash memory, and the like. In addition, or alternatively, the data store 134 may be a device that may read from and write to a removable media, such as, a floppy disk, a CD-ROM, a DVD-ROM, or other optical or magnetic media.

Figure 2:
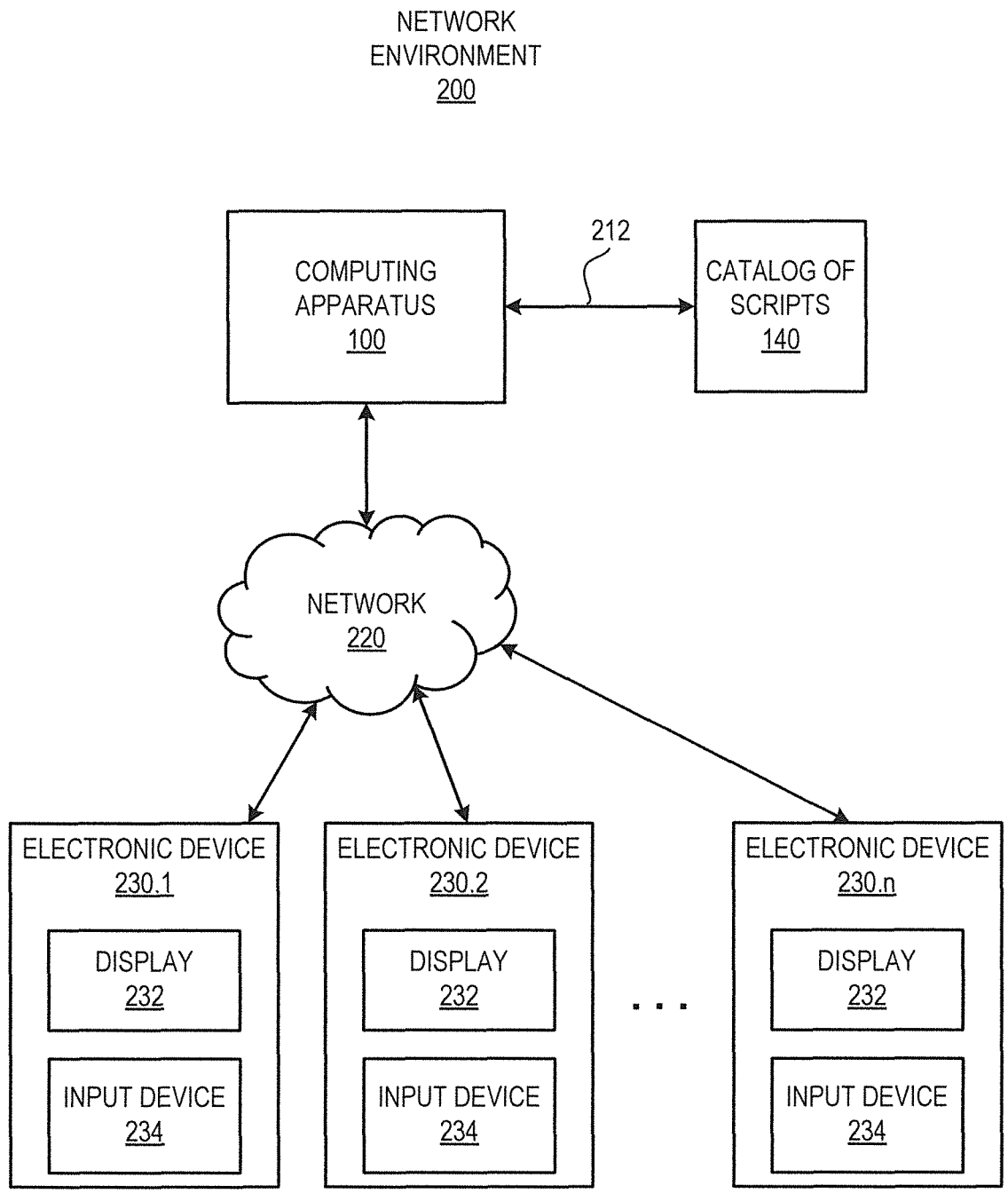
FIG. 2 depicts a simplified block diagram of a network environment including the computing apparatus depicted in FIG. 1, according to an example of the present disclosure.

The input/output interface 132 may include hardware and/or software to enable the processor 130 to communicate with the catalog of scripts 140 as well as an externally located electronic device (shown in FIG. 2). According to an example, the catalog of scripts 140 is stored in a memory of the computing apparatus 100, for instance, in the data store 134. In another example, the catalog of scripts 140 is stored in a memory that is external to and connected directly to the computing apparatus 100, such as through a USB interface or other interface. In a yet further example, the catalog of scripts 140 is stored in a memory that is external to and connected via a network connection to the computing apparatus 100. In this example, the catalog of scripts 140 may be stored in a server, a database, etc., and the input/output interface 132 may include hardware and/or software to enable the processor 130 to communicate over a network, such as the Internet, a local area network, a wide area network, a cellular network, etc., to the catalog of scripts.

Generally speaking, the catalog of scripts 140 is a searchable and interactive script catalog, in which the computing apparatus 100 may execute the scripts. The scripts may be, for instance, scripts for performing analytics over big data using map-reduce engines. As discussed in greater detail herein below, developers may add descriptions of new scripts into the catalog of scripts 140 and may use the shared knowledge of other community members when developing new scripts, descriptions of which may also be added into the catalog of scripts 140. In addition, each script, such as a Pig script, for which a description is added to the catalog of scripts 140 becomes an executable service, with inputs and outputs defined by relation schemas. Those services may be discoverable through use of natural language searches and may be composable using, for instance, a drag-and-drop interface, which may be provided to the users by the computing apparatus 100. In one regard, therefore, through implementation of the catalog of scripts 140 disclosed herein, a user may discover, compose, and run those services on their own the data without writing any code.

Figure 3:
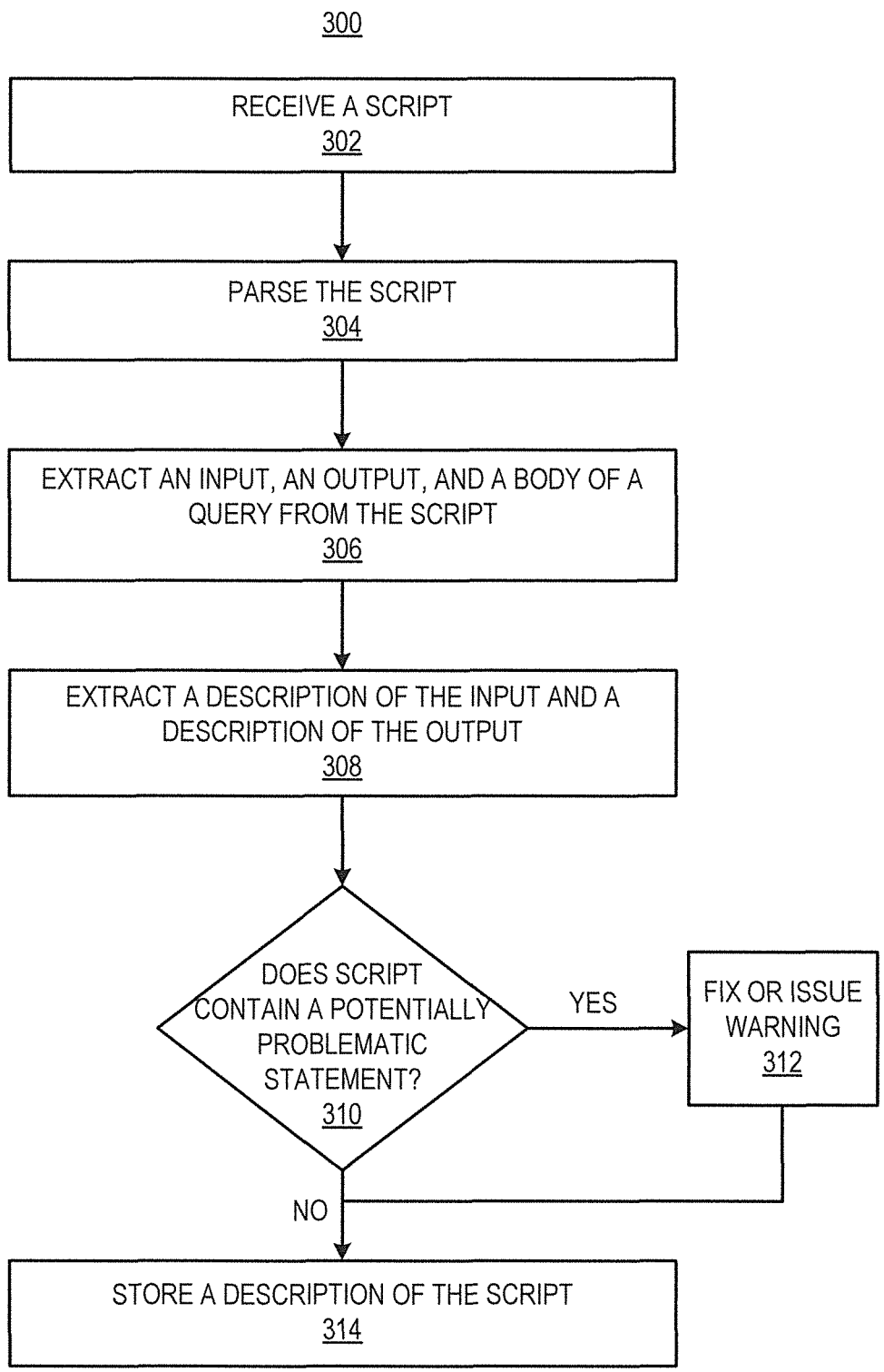
FIG. 3 depicts a flow diagram of a method for managing a catalog of scripts, according to an example of the present disclosure.
Figure 4:
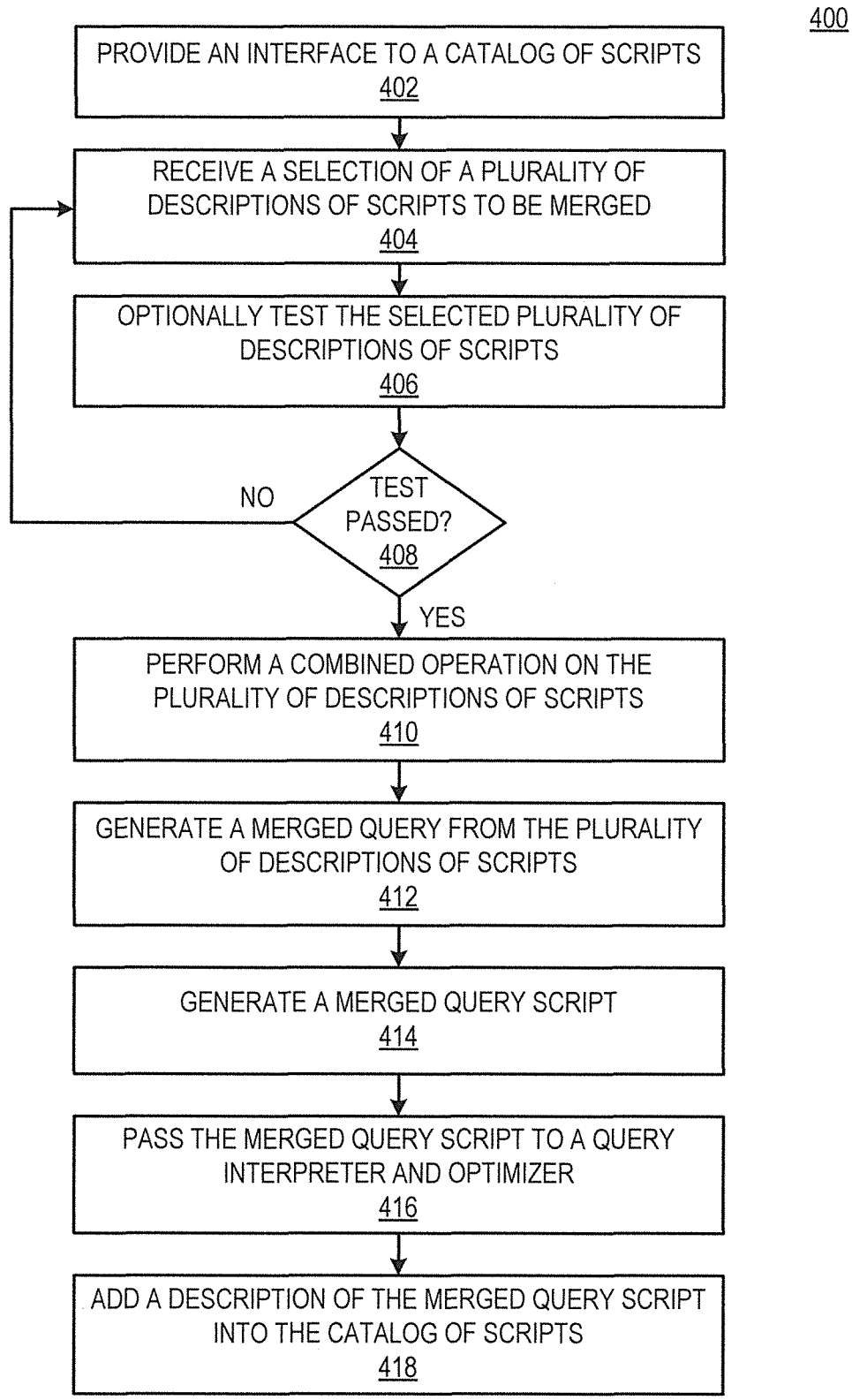
FIG. 4 depicts a flow diagram of a method for managing a catalog of scripts, according to another example of the present disclosure.

Various manners in which the catalog of scripts managing apparatus 102 in general and the modules 104-120 in particular may be implemented are discussed in greater detail with respect to the methods 300 and 400 depicted in FIGS. 3 and 4. Prior to discussion of the methods 300 and 400, however, reference is made to FIG. 2, in which is shown a simplified block diagram of a network environment 200 including the computing apparatus 100 depicted in FIG. 1, according to an example. It should be understood that the network environment 200 may include additional elements and that some of the elements depicted therein may be removed and/or modified without departing from a scope of the network environment 200.

The computing apparatus 100 may be in communication with the catalog of scripts 140 in any of the manners discussed above. As such, the catalog of scripts 140 may be stored in a storage device, a computer, a server, etc., and the computing apparatus 100 may access the catalog of scripts 140 either directly or over a network connection. According to an example, the computing apparatus 100 is also to provide access to the catalog of scripts 140 to a plurality of electronic devices 230.1-230.$n$, in which the variable "n" denotes an integer greater than one. The electronic devices 230.1-230.$n$ may be any of, for instance, laptop computers, tablet computers, personal digital assistants, cellular telephones, desktop computers, etc. Thus, for instance, a user may add, compose, modify, search for, etc., a script into the catalog of scripts 140 via an electronic device 230.1. As another example, a user may generate a new script from existing scripts identified in the catalog of scripts 140 and may store a description of the new script into the catalog of scripts 140.

According to an example, the computing apparatus 100 facilitates management of the catalog of scripts 140, for instance, access, modification, searching, and addition of script descriptions, by users of the electronic devices 230.1-230.n. For instance, the computing apparatus 100 may provide an interface that may be displayed graphically on respective displays 232 of the electronic devices 230.1-230.n In addition, users may provide inputs and may select graphical icons displayed on the displays 232 through respective input devices 234, which may be keyboards, mice, touchscreens, etc., of the electronic devices 230.1-230.n.

According to an example, the catalog of scripts 140 is stored on the computing apparatus 100 and the electronic devices 230.1-230.n may access the catalog of scripts 140 from the computing apparatus 100. In another example, the computing apparatus 100 may store the catalog of scripts 140 on a database accessible by the electronic devices 230.1-230.n through a server via the network 220. In either example, the network 220 may be any of the Internet, a local area network, a wide area network, a cellular network, etc. By way of example, the computing apparatus 100 may provide a webpage that is displayed on the respective displays 232 of the electronic devices 230.1-230.n.

As discussed in greater detail below, the computing apparatus 100 may enable definitions of scripts to be added to the catalog of scripts 140 in a relatively easy and automated manner, may enable the scripts in the catalog of scripts 140 to be relatively easily discoverable, may enable existing scripts to be combined to generate new scripts without requiring that user code the new scripts, etc.

Turning now to FIG. 3, there is shown a flow diagram of a method 300 for managing a catalog of scripts 140, according to an example. It should be apparent to those of ordinary skill in the art that the method 300 represents a generalized illustration and that other operations may be added or existing operations may be removed, modified, or rearranged without departing from a scope of the method 300. Although particular reference is made to the computing apparatus 100 depicted in FIGS. 1 and 2 as being an apparatus that may implement the operations described in the method 300, it should be understood that the method 300 may be performed in differently configured apparatuses without departing from a scope of the method 300.

At block 302, the computing apparatus 100 may receive a script. For instance, the input module 104 may receive a script for which a description is to be added to the catalog of scripts 140 by a user from an electronic device 230.1.

At block 304, the received script may be parsed. For instance, the script parsing module 106 may parse the script to determine the contents of the script, such as, an input, an output, and a body of a query contained in the script.

At block 306, an input, an output, and a body of a query may be extracted from the script. In addition, at block 308, a description of the input and a description of the output may be extracted. More particularly, for instance, the extracting module 108 may extract the description of an input from the name of relations of load statements and their respective schemas. The extracting module 108 may also extract from the script any runtime parameters and may also make the runtime parameters available as additional input descriptions For example, a script for an iterative algorithm may perform a fixed number of iterations, that number being specified as a parameter at runtime. In addition, the extracting module 108 may extract the output from the name of relations of store statements and any specified schemas. The extracting module 108 may further extract the body of the query from the original query by removing the load statements and the store statements from the original query. The body of the query may be the code that processes the inputs to generate the outputs. In other words, at block 306, the extracting module 108 may examine the script to determine what the script is loading in as its inputs, what the script is writing out as its outputs, and the code that the script uses to generate the outputs from the inputs.

Additionally, at block 308, a name of a variable that is being set from the input and a schema associated with the setting of the variable may be extracted, for instance, by the extracting module 108. By way of example, the extracting module 108 may extract information, such as the text of a message, a date on which the message was written, the name of the message author, etc. In this example, the schema for the message may be a message character array (chararray), which indicates that the message is a type of chararray; a date chararray, which indicates the date on which the message was written; a name chararray, which indicates the name of the author, etc.

At block 310, a determination may be made as to whether the script contains a potentially problematic statement. That is, for instance, the problematic statement determining module 110 may examine the parsed script for statements that may be incompatible with later merging. For example, the problematic statement determining module 110 may determine that the script contains a potentially problematic statement if a query in the script reuses a variable name in several different load operations, if a query in the script does a store and then later loads that stored data, etc.

At block 312, in response to a determination that the script contains a potentially problematic statement, the potentially problematic statement may be fixed and/or a warning may be issued to the user to correct the potentially problematic statement. For instance, the problematic statement fixing module 112 may fix the potentially problematic statement by refactoring and/or renaming a potentially problematic variable. In addition or alternatively, the problematic statement fixing module 112 may issue a warning to a user that a problem may exist with later merging of the script with another script. The problematic statement fixing module 112 may also receive instruction instructions from the user to rename a potentially problematic variable in the script.

At block 314, following a determination that the script does not contain a potentially problematic statement at block 310 or following block 312, a description of the script may be created and stored in the catalog of scripts 140, for instance, by the storing module 114. That description may include at least one of a description of the input, and the output, and the body of the query. The input module 104 may also receive input from a user pertaining to embellishment of the description of the script. That is, the user may input additional information that is to be stored with respect to the script, such as an identifier or name for the script, additional text describing inputs, outputs, and/or schemas of the script, etc. In one regard, the identifier or name of the script may enable the script to be discoverable through a natural language search. In addition, users may use the descriptions of the inputs, outputs, and/or schemas of the script in selecting scripts to be merged as discussed in greater detail herein below with respect to the method 400.

According to an example, users may be provided with an interface through which the users may input scripts that are to be added or ingested into the catalog of scripts 140. The interface may be a graphical user interface displayed on a user's computer and may provide the user with various options with respect to the inputting of scripts into the catalog of scripts 140. The interface may include various drop-down menus and/or input locations to guide users in the inputting of their respective scripts as well as in making changes to the scripts and naming the scripts.

Turning now to FIG. 4, there is shown a flow diagram of a method 400 for managing a catalog of scripts 140, according to another example. It should be apparent to those of ordinary skill in the art that the method 400 represents a generalized illustration and that other operations may be added or existing operations may be removed, modified, or rearranged without departing from a scope of the method 400. Although particular reference is made to the computing apparatus 100 depicted in FIGS. 1 and 2 as being an apparatus that may implement the operations described in the method 400, it should be understood that the method 400 may be performed in differently configured apparatuses without departing from a scope of the method 400.

Generally speaking, the method 400 pertains to managing a catalog of scripts 140 by enabling users to compose new scripts through merging of a plurality of scripts contained in a catalog of scripts 140. Thus, the method 400 may be implemented following implementation of the method 300. Alternatively, however, the method 400 may be implemented separately from the method 300.

At block 402, an interface to a catalog of scripts 140 may be provided. For instance, a user may access the interface module 116 through the network 220, such as through the Internet, and the interface module 116 may cause the interface to the catalog of scripts 140 to displayed on a display 232 of the user's electronic device 230.1. The interface to the catalog of scripts 140 may be a webpage or other portal through which users may discover the scripts contained in the catalog of scripts 140. According to an example, the interface to the catalog of scripts 140 may include drop-down menus to provide users with a listing of the scripts contained in the catalog of scripts 140. In addition, or alternatively, the interface to the catalog of scripts 140 may include an input into which users may input searches for particular scripts via keywords or other natural language searching. Thus, for instance, users may search for scripts that perform particular functions and/or scripts having particular names through the interface.

By way of a particular example, a user may determine that none of the scripts available from the catalog of scripts 140 individually performs a desired function or that the user is unable to locate an available script that individually performs the desired function. However, the user may determine that a first script in the catalog of scripts 140 is to accept the user's inputs, but does not output the desired output and that a second script is to output a desired output but does not accept the user's inputs. In this example, the user may select both the first script and the second script to be merged together to perform the desired function. The user may also select additional scripts in similar manners.

At block 404, a selection of a plurality of descriptions of scripts may be received, for instance, by the interface module 116. That is, the interface module 116 may receive a selection by a user of a plurality of descriptions of scripts from the catalog of scripts 140 that the user seeks to merge to obtain a desired output from a set of inputs. As discussed in greater detail herein below, the user may make the selection of the plurality of descriptions of scripts through manipulation of graphical representations of the descriptions of scripts along with links between the graphical representations. In one regard, users may select the descriptions of scripts based upon, for instance, descriptions of any of their inputs, outputs, schemas, functions, etc., and may thus select the descriptions of scripts without actually having knowledge of exactly how the scripts operate. According to an example, the descriptions of scripts may be provided in an ordered list of possible services that match the user's requirements. For instance, the ordering of the descriptions of the services or scripts may be based upon closeness of match and popularity.

At block 406, the scripts in the selected plurality of descriptions of scripts may optionally be tested, for instance, by the testing module 118. According to an example, the interface may include a feature, such as a button, that enables users to test the execution of the selected plurality of scripts with their own data. In addition, the testing module 118 may test the selected plurality of scripts using the user's inputs and the testing may result in an output. The output may be presented to the user through a display of the interface so that the user may determine whether implementation of the selected plurality of scripts results in the desired output.

In addition, at block 408, a determination may be made as to whether the test was successful. That is, the user may input an indication as to whether the test was successful, for instance, through the interface. In response to a determination that the test was unsuccessful, a selection of a plurality of descriptions of scripts in which at least one of the previously selected scripts is replaced may be received. In addition, block 406 may be performed again to determine whether the new selection of the plurality of scripts results in a desired output. Blocks 406 and 408 may also be repeated until a determination is made at block 408 that a testing of the selected plurality of definitions of scripts results in a desired output. Blocks 406 and 408 may be optional because a user may select a plurality of scripts to be merged without testing the plurality of scripts.

At block 410, following block 408 or block 404 if the selected plurality of scripts is not tested, a combined operation may be performed on the selected plurality of scripts. Particularly, for instance, the combined operation module 120 may perform the combined operation by merging the selected plurality of scripts together. The merging of the selected plurality of scripts together may include an examination of the inputs and the outputs of the selected plurality of scripts. For instance, the merging may include an examination of the output of a first script, which may be an input to a second script.

The examination may result in a determination that the schemas of the scripts do not match each other. In this instance, a warning may be issued to the user to modify the inputs and/or the outputs of at least one of the scripts to make the schemas match each other. In addition, or alternatively, the combined operation module 120 may attempt to manipulate the inputs and/or the output in order to make the schemas match each other. By way of example, a part of a tuple in an input and/or an output may be dropped in order to make the schemas match.

The examination may also include checking of the scripts for collisions in the names of the inputs and outputs of the scripts. If a collision exists, the name of the conflicting inputs or outputs may be refactored until no further collisions exist. Thus, for instance, both the names of the inputs and outputs in the scripts, as well as their usage throughout the queries, may be changed.

At block 412, a merged query may be generated from the selected plurality of scripts. For instance, the combined operation module 120 may, for each of the inputs and outputs of the scripts, determine whether the input is an initial input. In response to a determination that the input is an initial input, the load statement related to the input is written to the beginning of the merged query. In response to a determination that the output is a final output, the store statement related to the output is appended to the end of the merged query. For each pair of intermediate outputs and inputs, the load and store statements that are used only internally within a script may remain unchanged and the name of the intermediate input used in its original script may be refactored to the name of the intermediate output. In addition, the bodies of each of the scripts may be added to the merged query.

At block 414, a merged query script may be generated, for instance, by the combined operation module 120. Particularly, for instance, the combined operation module 120 may generate the merged query script by starting with the merged query and prepending any external load operations and appending any external store operations. By way of example, the different component scripts may be merged into a single script through a refactoring and remapping of the relation schemas so that the output of a script may be used directly as the input to another script to thus form a merged sequence of operations. The external load operations may be prepended to the merged sequence of operations and the external store operations may be appended to the merged sequence of operations, thus forming a single executable script for the composed service.

At block 416, the merged query script may be passed to a query interpreter and optimizer, for instance, by the combined operation module 120. The interpreter may parse a script to create a runtime plan and may then execute that plan. The optimizer may adjust the plan to make it run more efficiently, for example, by eliminating statements whose output is not used, or reordering commutative operations. The query interpreter and optimizer may be any suitable commercially available query interpreter and optimizer. In addition, or alternatively, the query interpreter and optimizer may be a customized query interpreter and optimizer. In one regard, the query interpreter and optimizer may be provided with the complete merged operation and may thus have a relatively higher likelihood at properly optimizing the merged plurality of scripts than if each script was run separately and filed or if pipes were used to join them together. That is, the query interpreter and optimizer may apply conventional techniques on the merged script because the merged script is a single script and not a plurality of scripts.

At block 418, a description of the merged query script may be added to the catalog of scripts 140, for instance, by the combined operation module 120. That description may include descriptions of the inputs and outputs of the merged query, along with the merged query or sufficient information to reconstruct the merged query later (for example, the identifiers of any component scripts and their interconnections). In addition, the interface module 116 may display an input location at which the user may embellish the description by adding additional human-readable information just as when a single script was added to the catalog as discussed above with respect to the method 300. In one regard, the embellishments may aid the user or other users in locating and using the newly added script in future operations.

According to an example, a description of the compiled and optimized version of the selected plurality of scripts may also be stored in the catalog of scripts 140 such that the efforts of building each composition of scripts may be amortized over a large number of users.

Some or all of the operations set forth in the methods 300 and 400 may be contained as a utility, program, or subprogram, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 5:
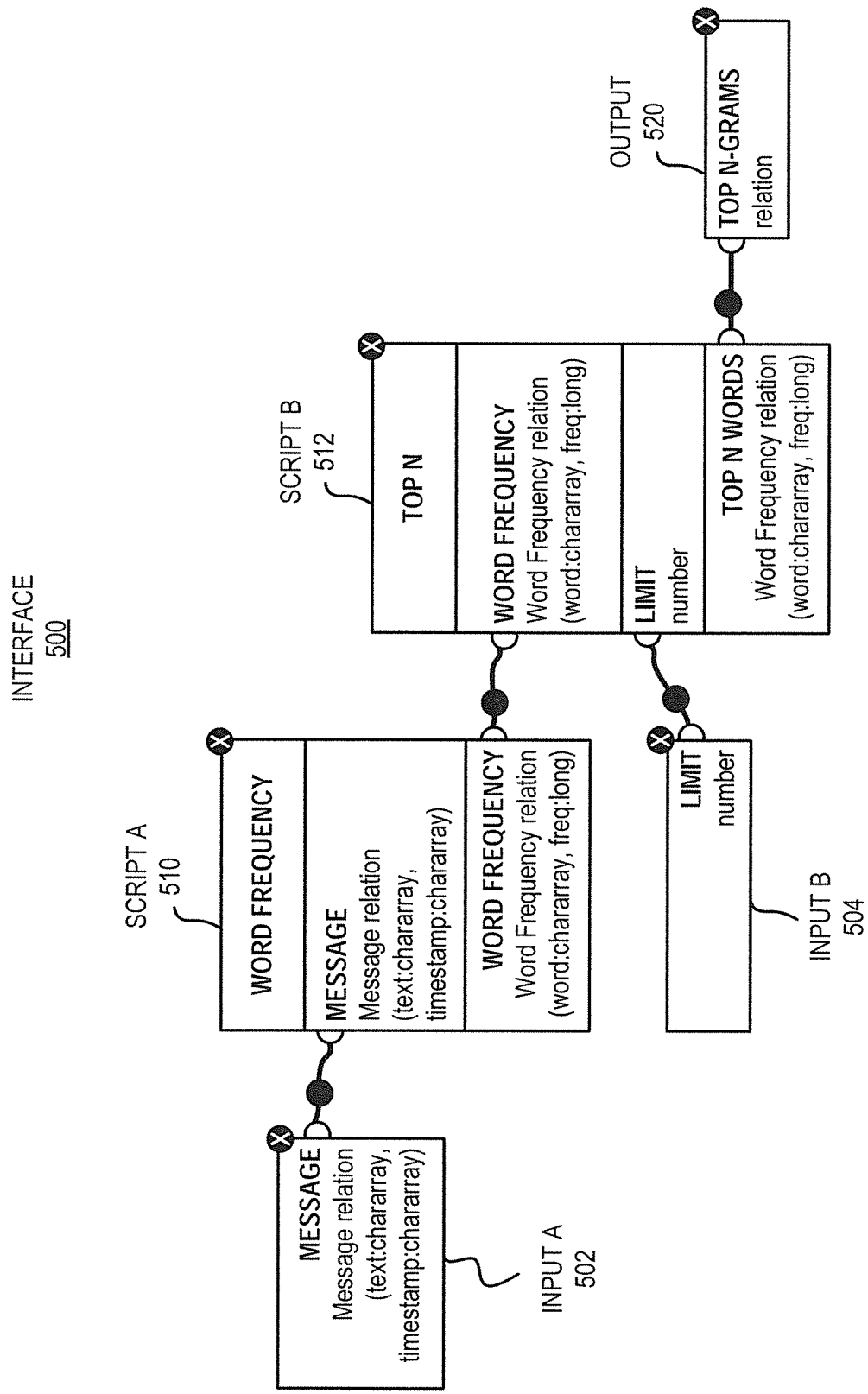
FIG. 5 depicts a simplified diagram of an interface, according to an example of the present disclosure.

Turning now to FIG. 5, there is shown a simplified diagram of an interface 500, according to an example. It should be clearly understood that the interface 500 may include additional elements and that some of the elements depicted therein may be removed and/or modified without departing from a scope of the interface 500 or the computing apparatus 100 disclosed herein.

Generally speaking, the interface 500 may be an interface that the interface module 116 may provide, e.g., cause to be displayed on the displays 232 of the electronic devices 230.1 to 230.*n*, to users over the network 220. Although not shown in FIG. 5, the interface 500 may include various "buttons" to enable users to navigate to different options and perform various operations in either or both of inserting scripts into the catalog of scripts 140 and composing new scripts. In addition, when a user selects to compose a new script, the interface may display a plurality of scripts that the user may select to merge together. Thus, for instance, the user may have determined that a single script contained in the catalog of scripts 140 is unable to perform a desired operation. The user may thus identify a plurality of scripts contained in the catalog of scripts 140 that, when executed together, may perform the desired operation.

The user may identify the scripts to be merged in any of a number of suitable manners. For instance, the user may perform a natural language search, e.g., a keyword search, on the catalog of scripts 140 and the user may select the scripts that are identified from the search. As another example, the user may perform a topic search and the computing apparatus 100 may determine which of the scripts most closely matches the searched topic. The computing apparatus 100 may also determine which of the matching scripts are the most popular, e.g., most often selected by users. The computing apparatus 100 may further display the matching scripts in order according to the degree with which the scripts match the search topic and/or their popularities among users.

As also shown in FIG. 5, the interface 500 enables users to view inputs, outputs, and the selected scripts in graphical form, for instance, through a drag-and-drop operation. In addition, the interface 500 may enable users to link the inputs and the scripts together such that users may easily visualize the operations performed by each of the scripts. Thus, for instance, the interface 500 provides users with a relatively simple manner of viewing the schemas of the inputs and the outputs of each of the scripts to determine which ones may be suitable for their desired tasks. In addition, although not shown in FIG. 5, the interface 500 may include a "Test" or similar button, which when activated, may perform a test on the selected plurality of scripts 510, 512 using the user's data such that the user may determine if the selected scripts perform the desired operations.

In the example composition depicted in FIG. 5, two scripts 510, 512 have been selected. In addition, a first input 502 may be the messages from which outputs are to be determined and a second input may be limit, e.g., the number of outputs to be determined from the messages. The first script 510 may find the frequency of words in the messages, e.g., the number of times a word appears in the messages, and the second script 512 orders the words by their frequency and returns the top-n words. The first script 510 may include the following lines:

allWords=FOREACH Message GENERATE FLATTEN (TOKENIZE(text)) AS (word);
  words=FILTER allWords BY SIZE(word)>0;
  SPLIT words INTO alphaNum IF word matches '\\w+', endsWith IF word matches '\\w+[\\.I\\)|\\!|\\?|\\'–|\\u2026]', startsWith IF word matches '[\\–|\\(|\\w+';
  ends=FOREACH endsWith GENERATE SUBSTRING (word, 0, (int)SIZE(word)–1);
  starts=FOREACH startsWith GENERATE SUBSTRING (word, 1, (int)SIZE(word));
  words=UNION alphaNum, starts, ends;
  groupedWords=GROUP words BY (word);
  Frequency FOREACH groupedWords GENERATE group, COUNT(words).

In addition, the second script 512 may include the following lines:

ordered=ORDER Words BY freq DESC;
TopN=LIMIT ordered $Amount.

It should be noted that the inputs 502, 504, the output 520, and the scripts 510, 512 in FIG. 5 are depicted as having a natural language descriptions or identifiers. That is, instead of merely depicting these elements as chararrays, these elements are depicted using natural language descriptions. In this regard, users may relatively easily understand the functions of each of these elements without knowing the code associated with the scripts. As discussed above, the interface 500 may guide users in entering the natural language descriptions for any new schemas. This may also be a semi-automated process, and may embellish the schemas with information that may not otherwise be available. For example, the schema may say "timestamp", but the description may add the additional knowledge that the timestamp is the creation time. In addition to descriptions for each relation, user assistance may be received to embellish the natural language translations for common operations on relation attributes. This may be achieved by displaying default translations and asking for corrections. Again using the example of the Message schema, the default translation for \timestamp==T" is \timestamp equals T", but the user may choose to alter that to the more natural "created at T".

As discussed above with respect to the method 400, the computing apparatus 100 may generate a merged query script from the first and second scripts 510, 512. That is, the first script 510 and the second script 512 may be merged into a single script, which is a composition of the two scripts 510, 512. The first script 510 and the second script 512 may be merged into the single script, for instance, to enable conventional query interpreters/optimizers to interpret and optimize the composition using conventional technique and to enable the composition to be readily accessible by future users. In the example depicted in FIG. 5, the merged query script may include the following lines:

Message=LOAD 'C:/user/tamezcan/tasks/5cbf7c45-d8fc-4cf6-a053-fc16e4a88c13/inputs/Message'
  USING PigStorage('\t')AS(text:chararray, timestamp: chararray);
  allWords=FOREACH Message GENERATE FLATTEN (TOKENIZE(text))AS(word);
  words=FILTER allWords BY SIZE(word)>0;
  SPLIT words INTO alphaNum IF word matches '\\w+', endsWith IF word matches '\\w+[\\.I\\)|\\!|\\!|\\-|\\u2026]', startsWith IF word matches '[\\–|\\(|\\w+';
  ends=FOREACH endsWith GENERATE SUBSTRING (word, 0, (int)SIZE(word)–1);
  starts=FOREACH startsWith GENERATE SUBSTRING (word, 1, (int)SIZE(word));
  words=UNION alphaNum, starts, ends;
  groupedWords=GROUP words BY (word);
  Frequency FOREACH groupedWords GENERATE group, COUNT(words);
// The following line maps the output of the first script to the input of the second script 512.
  Cmp_topN1_FrequencyWords=FOREACH Frequency GENERATE $0 AS word:chararray, $1 AS freq:long;
// The following line is the second script 512, which has been refactored to use the variable name corresponding to the output of the first script 510.
  ordered=ORDER Cmp_topN1_FrequencyWords BY freq DESC;
TopN=LIMIT ordered 5.

As may be seen in the merged query script, the required parameters have been instantiated, for example, after instantiating the $Amount parameter to 5, the top-5 frequently used words that appear in the messages may be returned. The merged query script may also be added to the catalog of scripts 140 under a designation that the user may have inputted to describe the merged query script.

Figure 6:
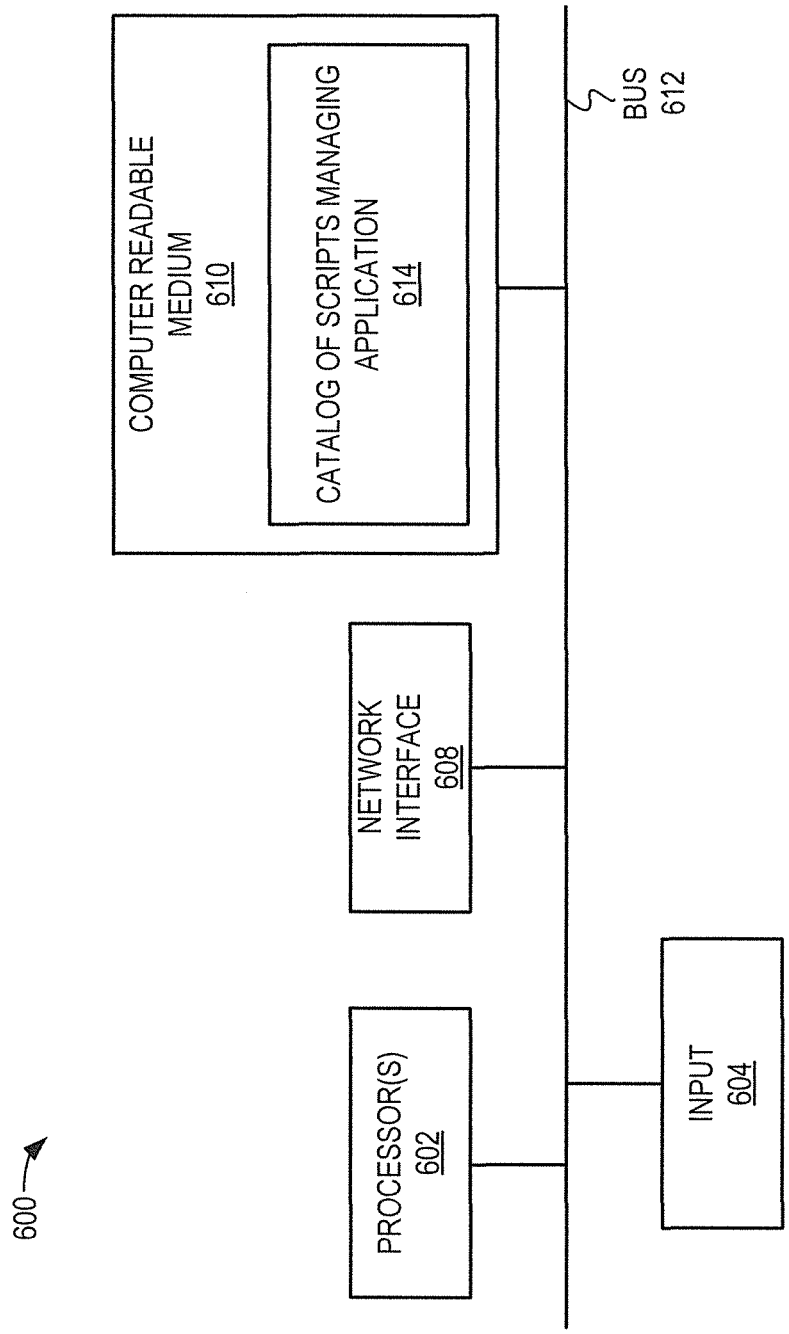
FIG. 6 illustrates a schematic representation of an electronic device, which may be employed to perform various functions of the computing apparatus depicted in FIGS. 1 and 2, according to an example of the present disclosure.

Turning now to FIG. 6, there is shown a schematic representation of an electronic device 600, which may be employed to perform various functions of the computing apparatus 100 depicted in FIGS. 1 and 2, according to an example. The device 600 may include a processor 602, an input 604; a network interface 608, such as a Local Area Network LAN, a wireless 802.11x LAN, a 3G mobile WAN or a WiMax WAN; and a computer-readable medium 610. Each of these components may be operatively coupled to a bus 612.

The computer readable medium 610 may be any suitable medium that participates in providing instructions to the processor 602 for execution. For example, the computer readable medium 610 may be non-volatile media, such as an optical or a magnetic disk; volatile media, such as memory. The computer-readable medium 610 may also store a catalog of scripts managing application 614, which may perform the methods 300 and 400 and may include the modules of the catalog of scripts managing apparatus 102 depicted in FIG. 1. In this regard, the catalog of scripts managing application 614 may include an input module 104, a script parsing module 106, an extracting module 108, a problematic statement determining module 110, a problematic statement fixing module 112, a storing module 114, an interface module 116, a testing module 118, and a combined operation module 120.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing a catalog of scripts, said method comprising:
  receiving a script;
  parsing the script;

extracting an input from the script;
extracting a description of the input that includes the name of a runtime parameter, or the name of a variable that is being set by loading data and any schema associated with the setting of the variable;
extracting an output from the script;
extracting a description of the output that includes the name of a variable that is being stored and any schema associated with the variable;
extracting a body of a query from the script;
determining, by a processor, whether the script contains a potentially problematic statement;
in response to a determination that the script contains a potentially problematic statement, at least one of fixing the potentially problematic statement and issuing a warning regarding the potentially problematic statement; and
storing a description of the script in the catalog of scripts that includes the body of the query and descriptions of the input and the output.

2. The method according to claim 1, wherein managing the catalog of scripts further comprises embellishing at least one of the description of the script, the description of the input, and the description of the output with human-readable text.

3. The method according to claim 1, wherein the body of the query is an original query minus the load statements and the store statements.

4. The method according to claim 1, wherein determining whether the input contains a potentially problematic statement further comprises determining whether the input contains a statement that is likely to be incompatible with later merging.

5. The method according to claim 1, further comprising:
receiving an identifier for the script; and
associating the received identifier with the script.

6. The method according to claim 1, further comprising:
providing an interface to the catalog of scripts;
receiving a selection of a plurality of scripts from the catalog of scripts, wherein the selected plurality of scripts is to perform a predetermined function; and
performing a combined operation by merging the selected plurality of scripts together.

7. The method according to claim 6, wherein each of the selected plurality of scripts comprises inputs, outputs, and respective schemas associated with the inputs and outputs, and wherein performing the combined operation further comprises:
determining whether the schemas of the inputs and the outputs of the selected plurality of scripts match each other; and
in response to a determination that the schemas of the inputs and the outputs do not match each other, at least one of manipulating the inputs and/or the outputs to make the schemas match each other and outputting an indication regarding the lack of match.

8. The method according to claim 7, further comprising:
generating a merged query from the plurality of scripts;
adding bodies of each of the plurality of scripts into the merged query;
generating a merged query script starting with the merged query, perpending any external load operations, an appending any external store operations to execute the merged query; and
passing the merged query script to a query interpreter and optimizer.

9. The method according to claim 8, further comprising:
adding a description of the merged query script into the catalog of scripts, the description of the merged query script comprising descriptions of the inputs, descriptions of the outputs, and sufficient information to enable the merged query to be constructed.

10. The method according to claim 6, further comprising:
displaying graphical depictions of each of the selected plurality of scripts and interactions between the selected plurality of scripts.

11. An apparatus to manage a catalog of scripts, said apparatus comprising:
a processor;
a memory on which is stored machine readable instructions that cause the processor to:
receive a script;
parse the script;
extract an input from the script;
construct a description of the input through extraction of a name of a runtime parameter, or a name of a variable that is being set from the input and any schema associated with the setting of the variable;
extract a body of a query from the script;
extract an output from the script;
construct a description of the output through extraction of a name of a variable that is being stored and any schema associated with the variable; and
store a description of the script in the catalog of scripts that includes descriptions of the inputs and outputs and the body of the query;
determine whether the input contains a potentially problematic statement; and
in response to a determination that the input contains a potentially problematic statement, at least one of fix the potentially problematic statement and issue a warning regarding the potentially problematic statement.

12. A non-transitory computer readable storage medium on which is stored machine readable instructions that when executed by a processor are to cause the processor to:
receive a script;
parse the script;
extract an input from the script;
extract a description of the input that includes the name of a runtime parameter, or the name of a variable that is being set by loading data and any schema associated with the setting of the variable;
extract an output from the script;
extract a description of the output that includes the name of a variable that is being stored and any schema associated with the variable;
extract a body of a query from the script;
determine whether the script contains a potentially problematic statement;
in response to a determination that the script contains a potentially problematic statement, at least one of fix the potentially problematic statement and issue a warning regarding the potentially problematic statement; and
store a description of the script in the catalog of scripts that includes the body of the query and descriptions of the input and the output.

13. The non-transitory computer readable method according to claim 12, wherein the machine readable instructions are further to cause the processor to:
embellish at least one of the description of the script, the description of the input, and the description of the output with human-readable text.

14. The non-transitory computer readable method according to claim 12, wherein to determine whether the input contains a potentially problematic statement, the machine readable instructions are further to cause the processor to:
   determine whether the input contains a statement that is likely to be incompatible with later merging.

\* \* \* \* \*